United States Patent [19]

Tilney

[11] Patent Number: 4,828,498

[45] Date of Patent: May 9, 1989

[54] FOOD EXCHANGES KIT, AND METHODS OF CONSTRUCTING AND UTILIZING SAME

[76] Inventor: Catherine Tilney, 16930 Josephine, Fraser, Mich. 48026

[21] Appl. No.: 68,352

[22] Filed: Jun. 30, 1987

Related U.S. Application Data

[63] Continuation-in-part of Ser. No. 696,116, Jan. 29, 1985, Pat. No. 4,689,019.

[51] Int. Cl.⁴ .............................................. G09B 19/00
[52] U.S. Cl. ................................................... 434/127
[58] Field of Search ........................................ 434/127

[56] References Cited

U.S. PATENT DOCUMENTS

| | | | |
|---|---|---|---|
| 2,314,387 | 3/1943 | Carlsson | 434/127 |
| 2,337,594 | 12/1943 | Easley | 434/127 |
| 2,391,539 | 12/1945 | Avery | 40/2 R X |
| 3,460,281 | 8/1969 | Levy | 40/489 |
| 4,310,316 | 1/1982 | Thomann | 434/127 |
| 4,460,179 | 7/1984 | Hafer | 434/127 X |
| 4,689,019 | 8/1987 | Tilney | 434/127 |

*Primary Examiner*—William H. Grieb
*Attorney, Agent, or Firm*—Brooks & Kushman

[57] ABSTRACT

A method and kit of components for implementing a diet using color co-ordinated food exchange cards to match foods of the major food groups in a food exchange list. Self-adhesive labels printed with various meal designations are provided for affixing to the food exchange cards. Other blank labels for writing special instructions are also provided for affixation to the food exchange cards. Each card represents one food exchange and is color co-ordinated to match the colors of the various food groups found in the American Diabetic Association booklet entitled "EXCHANGE LISTS FOR MEAL PLANNING". Food group identifying means are also preferably provided for affixation to selected foods or food packaging for easy identification of the marked food as a member of the indicated major food group.

22 Claims, 2 Drawing Sheets

FOOD EXCHANGES KIT, AND METHODS OF CONSTRUCTING AND UTILIZING SAME

This application is a continuation-in-part of U.S. Ser. No. 696,116, filed Jan. 29, 1985 now U.S. Pat. No. 4,689,019, issued Aug. 25, 1987.

BACKGROUND OF THE INVENTION

1. Field of the Invention

The present invention relates generally to a method and a kit of components for implementing a predetermined diet. More particularly, the present invention relates to a kit of components for simplifying the implementation of a system of diabetes control through diet.

In order to understand the importance of the present invention, an understanding of the underlying medical reasons may be helpful. Very simply put, any treatment and control of diabetes includes: 1. diet; 2. diet with oral medication; and/or 3. diet with insulin injections, which always are given on a daily basis. It is important to note from the foregoing that diet is an important factor in all of the various treatments enumerated.

Various caloric diets (ranging from 1,000 calories to 2,800 calories) have been prepared by the American Diabetic Association (ADA) and are used to treat diabetics. Although the ADA diet is a weight reducing diet in many cases, this is not necessarily so. Primarily, the ADA diet is a method of treating and controlling diabetes, and must be a day to day consistency of ratios of carbohydrate, protein and fat for each feeding. Once a certain caloric ADA diet is established for a particular patient in order to control the blood sugar within normal limits, it is a life time treatment. It must be adhered to without deviation for life.

Each ADA diet is individualized by physician prescription, and can only be changed by the physician. A patient must schedule his or her meals to provide regular caloric intake. Meal planning is necessary to avoid alternating periods of feasting and fasting, resulting in too high or too low blood sugar levels. The amount of meals ranges from 3 to 8 meals per day.

One approach to diabetic dietary management involves a system of food exchanges which can provide menu variety while maintaining consistent distribution of daily caloric intake. The exchange list system involves the grouping of foods with similar fat, carbohydrate and protein content into lists allowing the exchange of a portion of one food on a list with another on the same list while composing a menu. An exchange list system has been prepared by a committee of the American Diabetic Association and the American Dietetic Association in cooperation with National Institute of Health which exchange list system was published in 1976. While the lists assist in controlling total calories, and provide information concerning the amount and type of fat present in various foods, the varieties of foods listed are, of necessity, quite limited.

Furthermore, the exchange lists method is somewhat difficult to understand and complicated to use. Also, some foods commonly thought to be in one major food group are actually in another food group.

The foregoing factors coupled with the overwhelming nature of the patient's disease and treatment, results in the patient following the line of least resistance with results in non-adherence to the patient's prescribed diet. This non-adherence to the prescribed diet is a very critical factor in view of the fact that noncompliance with a diabetic diet is very often life-threatening.

In order to urge and help the patient to adhere to his or her diet by using exchange lists, the patient has to understand the lists and how to use them. This is the problem addressed by the present invention. The present invention provides a simple kit of components and a simple method to assist in understanding and using exchange lists. The present invention also provides a means for identifying foods which are commonly thought to be in one food group, but which are actually in another group.

All foods on a ADA diet must be eaten, and also foods designated to be eaten at one meal must be eaten at the meal and at no other time. No foods or meals must be "skipped". It is difficult for a diabetic to use this method of disease control. It is also difficult for the diabetic to understand and use the ADA exchange lists of foods allowed. But the most important aspect is that if the diabetic does not adhere to his or her ADA diet in the manner mentioned above, it could and very often is life-threatening.

Accordingly, the primary reason for the present invention is to help the diabetic understand and use the ADA diet and exchange lists, and to promote 100% compliance with the prescribed diet, thus keeping the blood sugar level under control.

When a diabetic's blood sugar level is out of control, symtoms are severe enough to require hospitalization. While the diabetic is in the hospital, the ADA diet is adjusted in an effort to keep the blood sugar level at a desired level. Additionally, medication doses (if any) are also adjusted. When the desired blood sugar level is achieved, the patient is sent home with an individualized ADA diet and lists of exchange foods which the patient may eat. This is where the problem arises. Very frequently, the patient has difficulty in understanding and using the prescribed ADA diet and exchange lists. It has been found that the diabetic patient requires a simple, effective way in order to adhere to his or her prescribed diet at home and also when eating away from home. Prior techniques and systems do not accomplish the desired result.

2. Description of Relevant Art

The relevant art is exemplified by the three patents discussed hereinbelow.

U.S. Pat. No. 2,314,387 issued in 1943 to Carlsson entitled "BALANCED DIET SELECTING APPARATUS" discloses the provision of a balancing support in the nature of a see-saw or teeter board fulcrumed centrally. An example card is mountable on the board at one end thereof and has illustrated thereon the elements of at least one balanced diet meal. Selective blocks of different weights each having illustrated thereon an element of a meal, are adapted to be placed on the other end of the board. The relation of the illustrations on the blocks to their respective weights is such that if blocks together illustrating a balanced diet meal or meals are placed on the board in a single layer and respectively on predetermined board areas the weights on opposite sides of the fulcrum will be equal and the board, once placed in a horizontal position, will remain in such position. On the other hand, if the blocks placed on the board collectively illustrate an improperly balanced diet meal or meals, then the weights on oppoiste sides of the fulcrum will be unequal and the board will tip from the horizontal position.

U.S. Pat. No. 2,337,594 issued in 1943 to Easley entitled "MENU CARD DESK" discloses a deck of cards, the different cards of which are so constructed that by selecting a group of cards and stacking them a complete well balanced menu will be contained in exposed indicia of the different stacked cards. The first of the cards has an opening therein, the second of the cards being disposed behind the first card and having a portion crossing and observable through the opening. The second card has an opening registrable with the opening in the first card, and the third card is disposed behind the second card and has a portion crossing observable through both the opening in the first and second card.

U.S. Pat. No. 4,310,316 issued in 1982 to Thomann entitled "DIET CONTROL APPARATUS" discloses a diet control means having lists of various food categories with each of such categories, in turn, listing specific items of food and their respective quantities thereof which constitute what may be referred to as obtainable with a single ticket. There is provided a plurality of containers corresponding to the number of meals to be eaten during a twenty-four hour period, and these containers contain a plurality of tickets which are, in turn, redeemable for obtaining a quantity of dieter-selected specific food items within the food category designated by the respective ticket. As the tickets are redeemed during the twenty-four hour period, the tickets are considered spent and placed within a container for the collection thereof.

SUMMARY OF THE INVENTION

The present invention provides a method and a kit of components for implementing a predetermined diet, comprising a first plurality of cards each of which represents one food exchange in a particular one of the major food groups. The kit of compnents also includes a second plurality of pre-printed self-adhesive labels corresponding to various meals for application to certain ones of the first plurality of food exchanges cards in accordance with the predetermined diet. The kit of components further contains a third plurality of blank self-adhesive labels to be marked by the user with special instructions for application to certain ones of the first plurality of food exchange cards in accordance with the predetermined diet. The kit of the present invention may also contain one or more self adhesive food group identification means each representing a food group, and which may be applied to foods or their packages for identifying that food as being in the indicated group.

It is an object of the present invention to provide a kit of components, a method of utilizing same, and a plan to simplify understanding and use of a complicated system of diabetes control through diet.

Another object of the invention is to provide a kit of components and a method which is medically oriented to control a disease, which is not necesarily being overweight, and which uses a consistent distribution of daily calories.

A further object of the invention is to provide a kit and a method as mentioned hereinabove wherein the cards are color coded to correspond to internationally recognized colors of major food groups.

Another object of the invention is to provide a kit and method as described hereinabove wherein foods commonly thought to be in one major food group, but which are actually in another major food group can be marked for quick and easy identification at the time of food selection by the dieter.

Another object of the invention is to provide a kit and a method as mentioned hereinabove wherein the cards are dimensioned for transporting in a shirt pocket or in a purse.

Yet another object of the invention is to provide a kit and method as mentioned hereinabove wherein the kit and method is individualized according to a diet prescribed by a physician.

Other object, details and features of the present invention will become apparent from the following detailed description of preferred embodiments thereof.

DETAILED DESCRIPTION OF PREFERRED EMBODIMENTS

Figure 1:
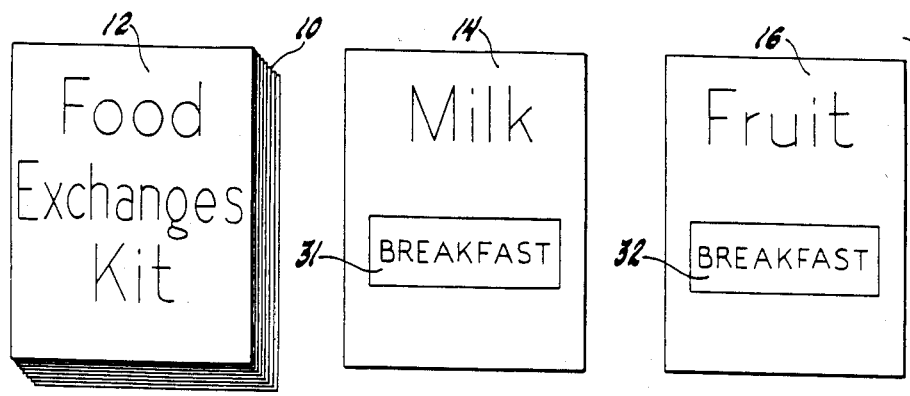
FIG. 1 illustrates a perspective view of the stack of 33 food exchange cards with the face card shown on top thereof.

With reference to FIG. 1, there is shown the stack 10 of the food exchange cards which form part of the kit of components in accordance with the present invention. The stack 10 represents the first plurality of cards each of which corresponds to one food exchange in a particular one of the major food groups.

Figure 3:
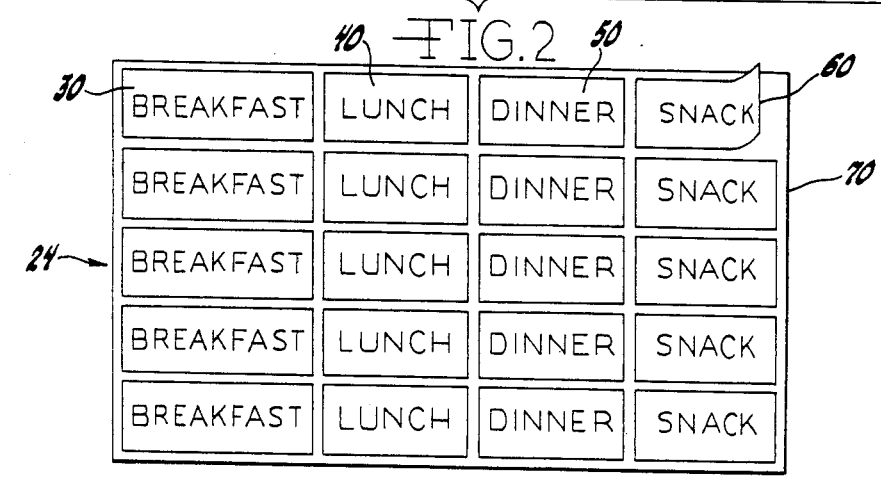
FIG. 3 illustrates a typical set of pre-printed self-adhesive labels forming a part of the kit of components in accordance with the invention.
Figure 4:
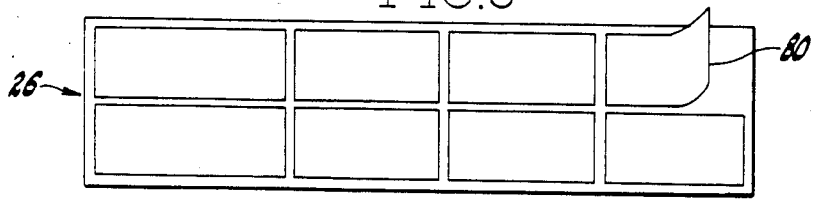
FIG. 4 illustrates a typical set of blank self-adhesive labels forming another part of the kit of components according to the present invention.

In accordance with a preferred embodiment of the present invention, a kit of components would include thirty-three food exchange cards 10, thirty-five pre-printed self-adhesive labels 24, some of which are illustrated in FIG. 3, a set of fourteen blank self-adhesive labels 26, some of which are illustrated in FIG. 4, instructions, and general information.

The thirty-three food exchange cards 10 would include a face card 12, three blue cards 14 each marked in large readable letters with the designation "MILK", three green cards (not shown) each marked in large readable letters with the designation "VEGGIES" to denote "vegetables", five orange cards 16 each marked in large readable letters with the designation "FRUIT", eight brown cards 18 each marked in large readable letters with the designation "BREAD", five yellow cards 20 each marked in large readable letters with the designation "FAT", and eight red cards 22 each marked in large readable letters with the designation "MEAT". Milk, vegetables, fruit, bread, fat, and meat denote the major food groups comprised from the ADA diet. Each of the cards 10 is preferably, but not necessarily, $2\frac{1}{2}''$ by $3\frac{1}{2}''$ (playing card size) to fit in a man's shirt pocket for taking with him when eating out, and for familiarity of handling. Each card 10 is color-coded to correspond to the internationally recognized colors of food groups: meat-read; milk-blue; fat-yellow; vegetable-green; fruit-orange; and bread-brown. Each card 10 is made of plastic heavy paper or cardboard material to permit the self-adhesive labels 24 and/or 26 to be easily placed, removed and replaced therefrom.

In accordance with a preferred embodiment of the present invention, there would be provided thirty-five pre-printed self-adhesive labels 24, some of which are illustrated in FIG. 3, to be applied by the patient or user to the food exchange cards 10 in accordance with a predetermined diet prescribed by a physician. The thirty-five labels 24 would consist of seven "BREAKFAST" labels 30, ten "LUNCH" labels 40, fifteen "DINNER" labels 50, and three "SNACK" labels 60. Such labels would be supplied in the kit mounted on a backing sheet 70 for easy removal therefrom.

The kit of components would also preferably include fourteen blank self-adhesive labels 26 to be marked by the user or patient with special instructions, if any, for example "½ exchange", and for use in applying to an appropriate food exchange card 10 in accordance with the prescribed diet.

Figure 5:
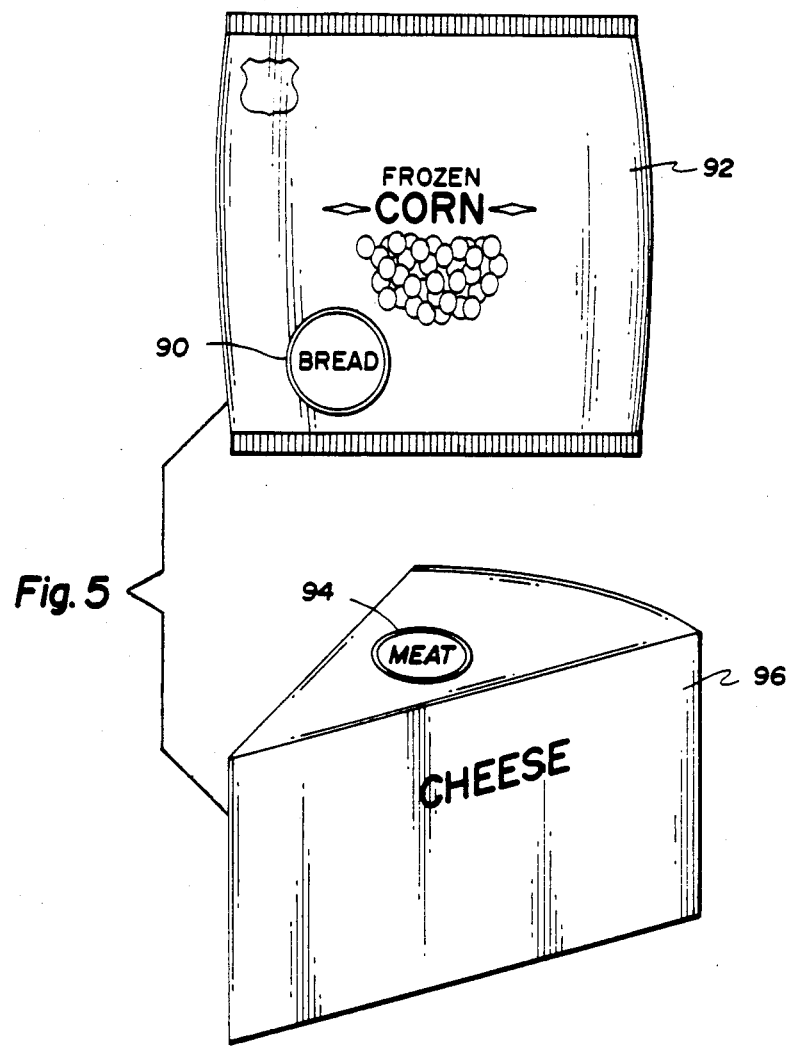
FIG. 5 illustrates the food group identifying means forming a part of the kit of components of the present invention.

Referring to FIG. 5, the kit of components would also preferably include a plurality of food group identifying labels 90 adapted to be secured to selected foods or their packages for quick and easy identification of foods otherwise mistakenly identified as belonging to another major food group. For example, corn is no longer considered to be a vegetable but is found in the "BREAD" group. Thus, a food group identifying label, preferably in the form of a self-adhesive label color coded to match the food exchanges cards, is affixed to the package 92 of corn. When the dieter reviews the food available for selection, the food group identifier will serve as a quick and easy reminder that the corn 92 is in the "BREAD" group rather than the vegetable group.

Similarly, a food group identifier 94 color coded or otherwise marked to indicate the major food group "MEAT" may be affixed to cheese 96 in order to indicate that cheese is a member of the "MEAT" group rather than the "DAIRY" group.

The kit of components and method in accordance with the present invention would preferably include an instruction sheet which would read as follows:

"FOOD EXCHANGES KIT"
INSTRUCTIONS

The cards are meant to be used as a teaching tool for those who must learn and adhere to a dieter regime, using food exchange lists, such as in diabetes or weight control programs.

Each card represents one food exchange and is color co-ordinated to match the colors of the various food groups found in the American Diabetic Association booklet, *EXCHANGE LISTS FOR MEAL PLANNING*. For example: BLUE-Milk; GREEN-Vegetables; ORANGE-Fruit; BROWN-Bread; YELLOW-Fat; RED-Meat. However, use of this kit is not limited to American Diabetic Association exchange lists booklet and may be used with any food exchange list.

HOW TO USE:

1. To the face of each card, apply the labels marked "Breakfast", "Lunch", "Dinner", "Snack" according to your particular diet plan. for example: If you are allowed (1) fruit, (1) milk, (2) bread, (2) fat, (1) meat for breakfast, apply the label, "BREAKFAST" on each of these exchange cards. Follow the same directions for "LUNCH", "DINNER", and "SNACK" cards. You may apply an extra label if needed, to write special instructions, i.e., "½ exchange". . . etc. Labels can be removed and re-applied if there is a change in your diet.

2. Separate the cards into groups putting "BREAKFAST" cards in one group, "LUNCH" cards in another group . . . etc. When planning your meals, simply match the color of the card with the color of the food group in the exchange lists booklet. You may choose as many exchanges in each particular food group as you have cards for, for that meal. After your meal the cards can be set aside and used over and over, everyday in planning meals. They can be carried in pocket or purse, when eating a meal out, letting you known instantly what foods are allowed for that meal. They eliminate guess work, allowing you to know at a glance whether you have eaten all the food you're allowed.

3. On your exchange lists, you will find some foods commonly thought to be in one food group are now in another food group. For example, corn is no longer considered a vegetable but is found in the "BREAD" group; Cheese is not to be considered a dairy product but is found in the "MEAT" group.

To help you identify these and other foods that are not in the food categories you thought they were, attach the enclosed "iDENT" stickers to food packages, cans, egg cartons etc. "iDENT" stickers are color co-ordinated to match your Food Exchanges Kit cards.

The cards are an effective teaching tool for all ages.

To facilitate understanding of the kit of components and the method of implementing and adhering to a predetermined diet in accordance with the present invention, a specific example of a particular diet prescribed by a physician will be discussed hereinbelow in connection with its use of the kit of components and the method of the present invention.

For example, a particular diabetic patient may receive the following 1500 calorie ADA diet prescribed by the patient's physician. The prescribed diet specifies that the patient is permitted to have a total of 2 food exchanges per day of milk, with 1 milk exchange at breakfast and a second milk exchange as a snack; 2 total food exchanges per day of vegetables, with 1 such food exchange occurring at lunch and the second food exchange occurring at dinner; 3 food exchanges per day of fruit, with 1 such fruit food exchange occurring at breakfast, 1 at lunch, and 1 at dinner; 6½ food exchanges per day of bread, with 1 such food exchange occurring at breakfast, 2 bread exchanges at lunch, 3 bread exchanges at dinner, and ½ bread exchange occurring as a snack; 4 food exchanges per day of fat, with 1 such food exchange occurring at breakfast, another at lunch, and 2 such food exchanges at dinner; and 6 food exchanges per day of meat, with 1 such food exchange occurring at breakfast, 2 food exchanges at lunch, and 3 at dinner. The foregoing prescribed diet and distribution of food exchanges is prescribed by the physician and is given to the diabetic patient as his or her individualized 1500 calorie ADA diet.

Figure 2:
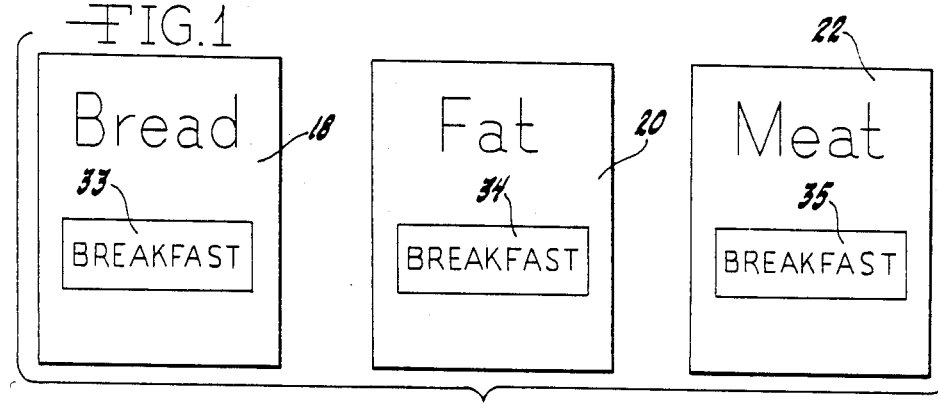
FIG. 2 illustrates 5 typical food exchange cards having pre-printed self-adhesive "BREAKFAST" labels affixed thereto.

To implement this prescribed diet with use of the present invention, the patient would open the kit of components and spread out the food exchange cards 10 before him or her. With reference to FIG. 2, the user would apply a pre-printed self-adhesive "BREAKFAST" label 31 to a blue food exchange card 14 marked "MILK". The user would also apply a pre-printed self-adhesive "BREAKFAST" label 32 to an orange food exchange card 16 marked "FRUIT"; a pre-printed self-adhesive "BREAKFAST" label 33 to a brown food exchange card 18 marked "BREAD"; a pre-printed self-adhesive "BREAKFAST" label 34 to a yellow food exchange card marked "FAT"; and a pre-printed self-adhesive "BREAKFAST" label 35 to a red food exchange card 22 marked "MEAT". Thus, FIG. 2 illustrates the particular food exchange cards and labels utilized for the breakfast meal by the patient for implementing and adhering the prescribed diet mentioned in the example hereinabove.

Similarly, the patient would apply a "LUNCH" label to a vegetable food exchange card, a "LUNCH" label to a fruit food exchange card, a "LUNCH" label to each of two brown (or bread) food exchange cards, a "LUNCH" label to a fat food exchange card, and a "LUNCH" label to each of two meat food exchange cards, in accordance with the 1500 calorie ADA diet mentioned hereinabove.

The patient would also apply a "DINNER" label to a vegetable food exchange card, a "DINNER" label to a fruit food exchange card, a "DINNER" to three bread food exchange cards, a "DINNER" label to two fat food exchange cards, and a "DINNER" label to three meat food exchange cards, in accordance with the mentioned exemplary ADA diet.

The patient would also apply a "SNACK" label 60 to a milk food exchange card, A "SNACK" label to a bread food exchange card, and would apply a blank label 80 to the bread food exchange card and write on such blank label "½ EX" to indicate that only a ½ food exchange is allowed for such snack.

As alluded to in the instruction sheet quoted hereinabove, the patient would then separate the food exchange cards 10 into groups putting "BREAKFAST" cards in one group, "LUNCH" cards in another group, etc. When a patient is planning his or her meals, he or she would simply match the color of the food exchange card 10 with the color of the food group in the exchange lists booklet. The patient is permitted to choose as many exchanges in each particular food group as he or she has cards for, for that meal. After each meal, the card can be set aside and used over and over, each day in planning meals. The cards 10 can be carried in pocket or purse, when eating a meal out, to let the patient know instantly what foods are allowed for that particular meal. The present invention with its kit of components and methods eliminates all guess work for the patient and/or dieter, and allows the patient to know at a glance whether the patient has eaten all the foods he or she has been allowed.

In accordance with the present invention, each food exchange card 10 represents one food exchange. After the patient has applied the appropriate labels 30, 40, 50, 60 and/or 80 to the prescribed food exchange cards 10, all cards in accordance with diet prescribed by the physician must be used when planning meals. All foods which each card represents must be eaten at the particular meal designated and at no other time. No foods are permitted to be "skipped".

In the preferred embodiment, includes a plurality of self-adhesive labels color coded to correspond to the internationally recognized colors of food groups. The patient would affix one of the color coded food group identifiers directly to the food or food packaging for any foods belonging to groups other than the groups that one would normally associate with the food. Thus, the patient would be immediately reminded upon perusal of the food that the particular food belongs to the food group associated with the self-adhesive identifier.

Each ADA diet is individualized by the prescribing physician for the particular patient. Thus, with use of the method of the present invention and the novel kit of components, each exchange kit is individualized by the prescribing physician and the patient to a particular diet to fit the needs of the particular patient. For example, there are several different 1500 calorie ADA diets, each having a different distribution of foods other than the distribution specified hereinabove in connection with the explained example, making it necessary to individualize the food exchange cards.

While the present invention has been described in connection with a preferred embodiment, it is not to be limited to the foregoing description, because many variations thereof may be evident to one skilled in the art and are intended to be encompassed in the present invention as set forth in the following claims.

What is claimed is:

1. A method of implementing and adhering to a predetermined diet, comprising the steps of:
   (a) applying a pre-printed self-adhesive "BREAKFAST" label to a first predetermined number of food exchange cards representing predetermined major food groups in accordance with said predetermined diet;
   (b) applying a pre-printed self-adhesive "LUNCH" label to a second predetermined number of food exchange cards representing predetermined major food groups in accordance with said predetermined diet;
   (c) applying a pre-printed self-adhesive "DINNER" label to a third predetermined number of food exchange cards representing predetermined major food groups in accordance with said predetermined diet;
   (d) applying a self-adhesive food group identifier label including indicia corresponding to one of the major food groups to a food item or its packaging;
   (e) assembling into a first group all of said food exchange cards to which has been applied a "BREAKFAST" label;
   (f) assembling into a second group all of said food exchange cards to which has been applied a "LUNCH" label;
   (g) assembling into a third group all of said food exchange cards to which has been applied a "DINNER" label;
   (h) planning a breakfast meal by matching each said food exchange card to which has been applied a "BREAKFAST" label with foods corresponding to the particular food group of each such food exchange card appearing in a food exchange lists booklet;
   (i) planning a "LUNCH" meal by matching each said food exchange card to which has been applied a "LUNCH" label with foods corresponding to the particular food group of each such food exchange card appearing in a food exchange lists booklet; and (j) planning a "DINNER" meal by matching each said food exchange card to which has been applied a "DINNER" label with foods corresponding to the particular food group of each such food exchange card appearing in a food exchange lists booklet.

2. A method according to claim 1, wherein:

said food exchange cards are color co-ordinated to match the colors of the various food groups found in a food exchange list; and planning said breakfast, lunch and dinner meals by simply matching the color of the food exchange cards with the color of the food group in said food exchange list.

3. A method according to claim 1, including the steps of:

applying a pre-printed self-adhesive "SNACK" label to a fourth predetermined number of food exchange cards representing predetermined major food groups in accordance with said predetermined diet;

assembling into a fourth group all said food exchange cards to which has been applied a "SNACK" label; and planning a snack meal by matching the food groups corresponding to the food exchange cards to which the "SNACK" label has been applied with corresponding food groups in said food exchange lists booklet.

4. A method according to claim 2, including the steps of:

applying a pre-printed self-adhesive "SNACK" label to a fourth predetermined number of food exchange cards representing predetermined major food groups in accordance with said predetermined diet;

assembling into a fourth group all said food exchange cards to which has been applied a "SNACK" label; and planning a snack meal by matching the food groups corresponding to the food exchange cards to which the "SNACK" label has been applied with corresponding food groups in said food exchange lists booklet.

5. A method according to claim 1, wherein:

each said food exchange card represents one food exchange and is color co-ordinated to match the colors of the various foods in each particular food group found in the American Diabetic Association booklet entitled "EXCHANGE LISTS FOR MEAL PLANNING"; and including the step of when planning meals matching the color of each food exchange card with the color of the food in the various food groups in said booklet.

6. A method according to claim 2, wherein:

each said food exchange card represents one food exchange and is color co-ordinated to match the colors of the various foods in each particular food group found in the American Diabetic Association booklet entitled "EXCHANGE LISTS FOR MEAL PLANNING"; and including the step of when planning meals matching the color of each food exchange car with the color of the food in the various food groups in said booklet.

7. A method according to claim 3, wherein:

each said food exchange card represents one food exchange and is color co-ordinated to match the colors of the various foods in each particular food group found in the American Diabetic Association booklet entitled "EXCHANGE LISTS FOR MEAL PLANNING"; and including the step of when planning meals matching the color of each food exchange card with the color of the food in the various food groups in said booklet.

8. A method according to claim 4, wherein:

each said food exchange card represents one food exchange and is color co-ordinated to match the colors of the various foods in each particular food group found in the American Diabetic Association booklet entitled "EXCHANGE LISTS FOR MEAL PLANNING"; and including the step of when planning meals matching the color of each food exchange card with the color of the food in the various food groups in said booklet.

9. A method according to claim 1, including the step of:

applying a blank self-adhesive label to a fifth predetermined number of food exchange cards representing predetermined major food groups in accoording with said predetermined diet, and on each such applied blank label marking special instructions.

10. A method according to claim 2, including the step of:

applying a blank self-adhesive label to a fifth predetermined number of food exchange cards representing predetermined major food groups in accordance with said predetermined diet, and on each such applied blank label marking special instructions.

11. A method according to claim 4, including the step of:

applying a blank self-adhesive label to a fifth predetermined number of food exchange cards representing predetermined major food groups in accordance with said predetermined diet, and on each such applied blank label marking special instructions.

12. A method according to claim 8, including the step of:

applying a blank self-adhesive label to a fifth predetermined number of food exchange cards representing predetermined major food groups in accordance with said predetermined diet, and on each such applied blank label marking special instructions.

13. A method according to claim 1 wherein said self-adhesive food group identifiers are each color co-ordinated to match the colors of various correspondingly color co-ordinated food groups found in a food exchange list.

14. A method according to claim 13 wherein the colors of the self-adhesive food group identifiers match the colors of the various food groups in each particular food group found in the American Diabetic Association booklet entitled "EXCHANGE LISTS FOR MEAL PLANNING".

15. A kit of components for facilitating implementation of and adherence to a predetermined diet, comprising:
  a first plurality of cards each of which represents one food exchange in a particular one of a major food group;
  a second plurality of pre-printed self-adhesive labels corresponding to various meals for application to certain ones of said first plurality of food exchange cards in accordance with said predetermined diet;
  a third plurality of blank self-adhesive labels to be marked by the user with special instructions for application to certain ones of said first plurality of food exchange cards in accordance with said predetermined diet; and
  a fourth plurality of self-adhesive labels, each including indicia of a particular major food group, for application to selected foods or food packaging in the corresponding major food group.

16. A kit of components according to claim 15, wherein:
  said plurality of food exchange cards are color co-ordinated to match internationally recognized colors of the major food groups.

17. A kit of components according to claim 15, wherein:
  said fourth plurality of self-adhesive labels are color co-ordinated to match internationally recognized colors of the major food groups.

18. A kit of components according to claim 15, whrein:
  said pre-printed self-adhesive labels provide a plurality of labels marked "BREAKFAST", a plurality of labels marked "LUNCH", a plurality of labels marked "DINNER", and a plurality of labels marked "SNACK"; and
  said plurality of food exchange cards are fabricated from a stiff material to facilitate application, removal, and re-application thereto of said pre-printed self-adhesive labels and/or said blank self-adhesive labels.

19. A kit of components according to claim 16, wherein:
  said pre-printed self-adhesive labels provide a plurality of labels marked "BREAKFAST", a plurality of labels marked "LUNCH", a plurality of labels marked "DINNER", and a plurality of labels marked "SNACK"; and
  said plurality of food exchange cards are fabricated from a stiff material to facilitate application, removal, and re-application thereto of said pre-printed self-adhesive labels and/or said blank self-adhesive labels.

20. A kit of components according to claim 15, wherein:
  said plurality of food exchange cards are dimensioned to fit within a man's shirt pocket.

21. A kit of components according to claim 16, wherein:
  said plurality of food exchange cards are dimensioned to fit within a man's shirt pocket.

22. A kit of components according to claim 19, wherein:
  said plurality of food exchange cards are dimensioned to fit within a man's shirt pocket.

* * * * *